United States Patent [19]

Blanchard

[11] Patent Number: 5,601,000
[45] Date of Patent: Feb. 11, 1997

[54] GEARBOX WITH INCORPORATED CLUTCH FOR SELF-PROPELLED MACHINES

[76] Inventor: Robert Blanchard, 5, rue du Mont Mercure, 85510 Le Boupere, France

[21] Appl. No.: 304,704

[22] Filed: Sep. 12, 1994

[30] Foreign Application Priority Data

Sep. 10, 1993 [FR] France .................................. 93 10776

[51] Int. Cl.$^6$ .................................................. F16H 3/083
[52] U.S. Cl. ................................................ 74/371; 192/66.2
[58] Field of Search ........................ 74/371–372; 192/66

[56] References Cited

U.S. PATENT DOCUMENTS 4,841,794  6/1989  Hikishima .

FOREIGN PATENT DOCUMENTS

| 923171 | 6/1947 | France . | |
| 1000492 | 2/1952 | France . | |
| 1046279 | 12/1953 | France . | |
| 2660977 | 10/1991 | France | 192/66 |
| 1256997 | 9/1986 | U.S.S.R. | 74/371 |
| 94005931 | 3/1994 | WIPO | 74/372 |

*Primary Examiner*—Rodney H. Bonck
*Assistant Examiner*—Mary Ann Battista
*Attorney, Agent, or Firm*—Young & Thompson

[57] ABSTRACT

A gearbox for self-propelled machines such as lawn-mowers, comprising a frame within which are disposed a primary shaft (1) provided with a gear train (8) of this latter, and a secondary shaft (2) provided with a gear train (9) that is free about the secondary shaft (2). Each gear (8) of the primary shaft (1) is maintained in permanent engagement with a gear (9) of the secondary shaft (2). The primary shaft (1) is driven in rotation by an endless screw (7), in engagement with a toothed wheel (4), by a cone clutch whose cones (3) are mounted slidably upon and kinematically freely and come into engagement with the conical bearing surfaces of the driven member. The movement of rotation of the primary shaft (1) is transmitted to the secondary shaft (2) by a movable key (12) mounted on the secondary shaft.

5 Claims, 6 Drawing Sheets

GEARBOX WITH INCORPORATED CLUTCH FOR SELF-PROPELLED MACHINES

FIELD OF THE INVENTION

The present invention relates to a gearbox more particularly adapted for self-propelled machines such as lawn mowers.

BACKGROUND OF THE INVENTION

The gearboxes installed at present in self-propelled machines of the lawn mower type comprise a frame within which is enclosed a primary shaft disposed generally parallel to a secondary shaft and transmitting to this latter its rotative movement by means of an assembly of gears and a movable key ensuring the change of speed. Stopping the drive of the primary shaft means permitting changing the speed is achieved by a principal clutch device disposed outside the frame. This clutch device is generally a friction clutch mechanism constituted by a transmission belt disposed in an annular groove of a rotating pulley, this transmission belt being by variation of its tension maintained or not within the groove so as to drive or not the primary shaft. This type of clutch, in addition to its size, is difficult to adjust. Thus, it is noted that in such mechanisms, the shaft is sometimes driven while the drive belt is slackened. Moreover, as this clutch is not a progressive clutch, it requires in order to avoid shocks, the installation of an auxiliary clutch. Such a transmission device is for example described in U.S. Pat. No. 4,841,794. In this patent, the speed change shaft and the output shaft are two coaxial shafts adapted to be connected together by means of an auxiliary clutch with teeth or balls. The principal clutch and the auxiliary clutch are connected by a clutch lever.

French Patent FR-A-92.3171 describes a speed change gearbox comprising a primary shaft, a secondary shaft and an intermediate shaft. The clutch as described in this patent is a clutch of the claw-type actuated by means of a fork. Clutching takes place by means of the keys contained in the groove of the primary shaft and spaced by the truncated conical piston which acts under the influence of one or several longitudinal springs disposed within the primary shaft. These keys lock, during their displacement, a speed change gear in engagement with the first pinion or a second pinion coming to rest within recesses provided in said pinion. In locked position, the shaft, the keys, the springs and the speed change gear form a rigid entity which turns as a unit. This rotative movement is transmitted to the intermediate shaft which itself transmits it to the output shaft. This gearbox is cumbersome and requires three shafts to be able to operate.

OBJECTS OF THE INVENTION

The object of the present invention is to overcome the recited drawbacks by providing a gearbox associated with a more reliable progressive clutch mechanism and also integrating the assembly into the same casing so as to obtain a complete gearbox which is very compact.

Another object of the present invention is to simplify the construction of the gearbox in particular, by decreasing the number of pieces so as to render the gearbox less cumbersome.

SUMMARY OF THE INVENTION

The invention provides for this purpose a gearbox for self-propelled machines such as lawnmowers, of the type comprising a frame within which are disposed a primary shaft provided with a gear train mounted for rotation with this latter, a secondary shaft provided with a gear train disposed coaxially and freely mounted for rotation about said shaft, each pinion of the gear train of the primary shaft being respectively maintained in permanent engagement with the corresponding pinion of the secondary shaft, characterized in that the primary shaft is driven in rotation by means of a reducing mechanism constituted by a drive member, such as an endless screw, engaged with the driven member, such as at least one toothed wheel, adapted to be coupled to or engaged with or disengaged from said primary shaft by means of a clutch mechanism, such as a cone clutch, whose cones are freely slidably mounted and kinematically connected in rotation to the primary shaft and are disposed within an axial recess in the driven member and come during their movement together into engagement with conical engagement surfaces of the driven member and in that the rotative movement of said primary shaft is transmitted to the secondary shaft by means of a movable key mounted on the secondary shaft which, during its axial displacement, comes into contact selectively with a recess provided in the peripheral internal edge of the gear carried by the secondary shaft so as selectively to key this pinion to the secondary shaft.

According to a preferred embodiment of the invention, the clutch mechanism comprises at least two toothed wheels in engagement respectively with at least one clutch cone, said toothed wheels being maintained kinematically fixed in rotation by penetration of the teeth projecting beyond the front surface of at least one of the wheels in the interstices of complimentary shape of the forward face of the wheel facing it so as to maintain between said wheels a permanent contact without play in rotation in the engaged position.

BRIEF DESCRIPTION OF THE DRAWINGS

Further characteristics and advantages of the invention will become apparent from a reading of the detailed description which follows and the accompanying drawings, in which.

DETAILED DESCRIPTION OF THE INVENTION

Figure 1:
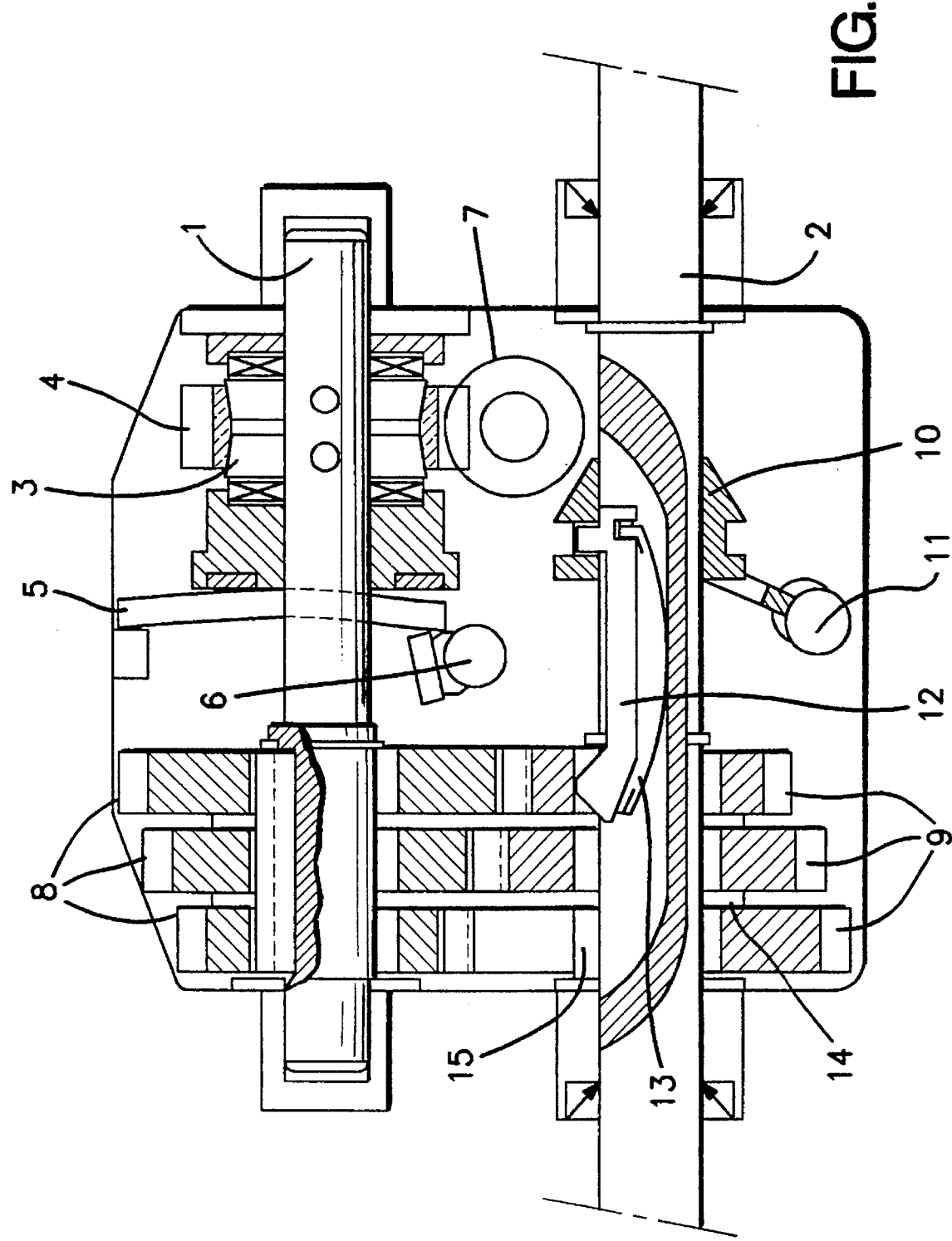
FIG. 1 represents a cross-sectional view of a gearbox according to the invention.

According to FIG. 1, the gearbox of the invention, adapted particularly to be installed in self-propelled machines such as lawnmowers, comprises a frame within which are disposed a primary shaft 1 and a secondary shaft 2. These shafts are generally parallel for simplicity of construction and operation. The secondary shaft 2 generally constitutes the drive shaft of the wheels of the self-propelled machine. As to the primary shaft 1, it is connected to the motor by an appropriate speed reduction mechanism. The primary and secondary shafts are respectively provided with gear trains. The primary shaft 1 comprises a gear train 8 mounted kinematically permanently in rotation with said shaft gear, the secondary shaft 2 comprises a gear train 9 disposed coaxially and mounted freely in rotation about said shaft. Moreover, each gear 8 of the gear train of the primary shaft 1 is in permanent engagement respectively with a gear 9 of the secondary shaft 2.

The operation of such an assembly is as follows: the primary shaft 1 is driven in rotation by means of a speed reduction mechanism constituted by a driving member such as an endless groove 7 in engagement with a driven member such as a toothed wheel 4. The endless groove 7 is mounted fixedly at its end to a pulley driven in rotation by means of a transmission belt which connects the pulley to the motor. The toothed wheel 4 driven in rotation is adapted to be coupled with or uncoupled from the primary shaft 1 by means of a suitable clutch mechanism. The clutch mechanism shown in FIG. 1 is a cone clutch mechanism whose cones 3 are mounted freely slidably and kinematically fixed in rotation with the primary shaft 1. The cones 3 are disposed within an axial recess of the toothed wheel 4 and come during the course of moving together into engagement with conical abutment surfaces of said wheel 4. Bringing together these cones giving rise to movement to engaged position is controlled by a suitable actuating member such as a clutch fork 5 controlled in its displacement by a cam shaft 6 driven in rotation about an axis perpendicular to the primary shaft 1. During its axial displacement along the longitudinal axis of the primary shaft 1, the fork 5 coacting with one of the support bearings of the shaft 1 in the frame causes the bringing together of the cones to engage them between its active surface and the bearing surface of the cone.

Figure 2:
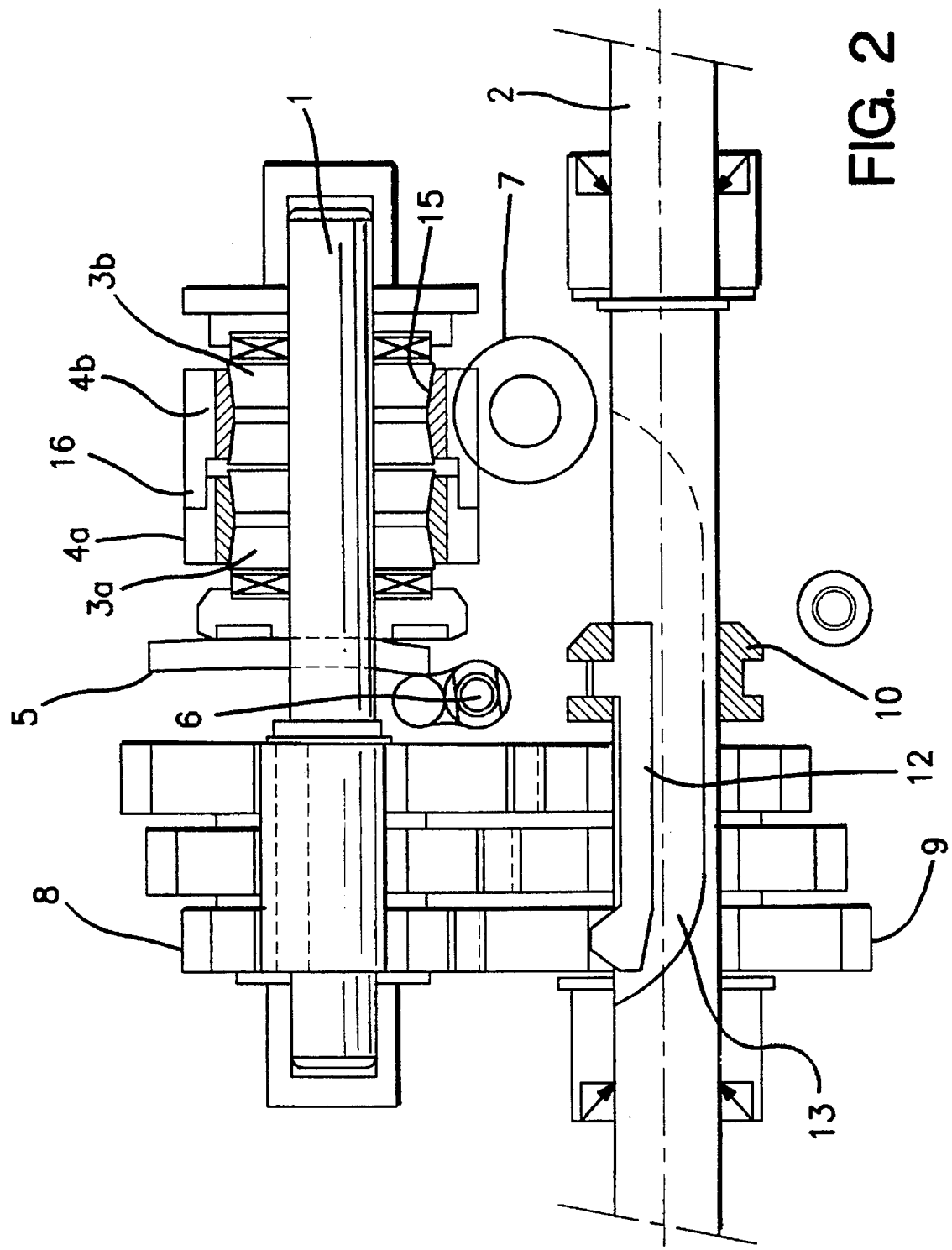
FIG. 2 represents a view identical to FIG. 1 of the gearbox provided with a double clutch.

In a preferred embodiment of the invention shown in FIG. 2, it is possible to improve the clutch mechanism so as to increase its drive capacity. In this case, the clutch mechanism comprises at least two toothed wheels 4a and 4b in engagement respectively with at least one clutch cone 3a, 3b, said toothed wheels being maintained kinematically fixed in rotation by penetration of the teeth 16 projecting beyond the forward face of at least one of the wheels into the interstices 17 of complementary shape of the front surface of the wheel which faces it so as to maintain between said wheels a permanent contact without play in rotation in engaged position.

Figure 3:
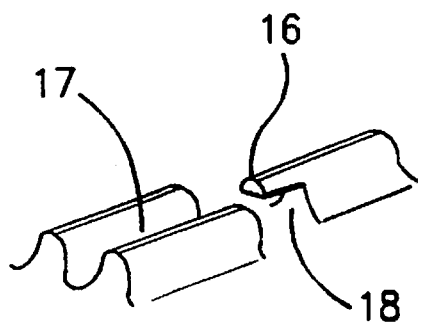
FIG. 3 represents a perspective view of a tooth of a toothed wheel penetrating the interstice provided between the two teeth of a toothed wheel facing it.

In the example shown in FIG. 2, one of the wheels has a recess 18 provided in one of its forward surfaces so as to let at least one toothed pass such that the tooth will penetrate the interstice between two teeth of the confronting wheel. This recess 18 is provided at a variable height in the space comprised between the circumference passing through the base of the teeth and the circumference passing through the tips of the teeth as shown in FIG. 3. Thanks to this arrangement, it is possible to arrange a cone clutch mechanism comprising at least four cones freely mounted slidably and kinematically fixed in rotation with the primary shaft, said pairs of cones being respectively disposed coaxial to the interior of the axial bore of the toothed wheel so as to come, when together, into engagement with the conical bearing surfaces of said wheels. Because of this particularly interesting design of the clutch mechanism, the essential advantage of the gearbox will be gained, which resides in its compactness. This compactness is due to the fact that the primary shaft bears both a set of gears permitting driving the secondary shaft and the clutch mechanism.

Figure 5:
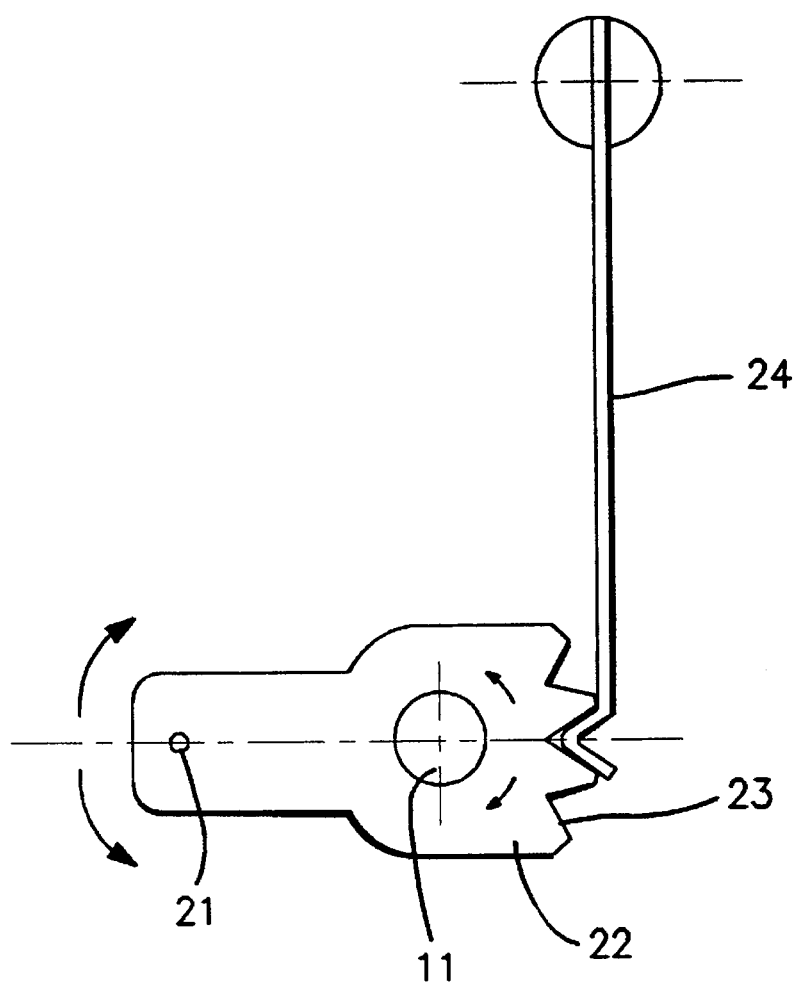
FIG. 5 represents a fragmentary schematic view of the speed selection lever.
Figure 4:
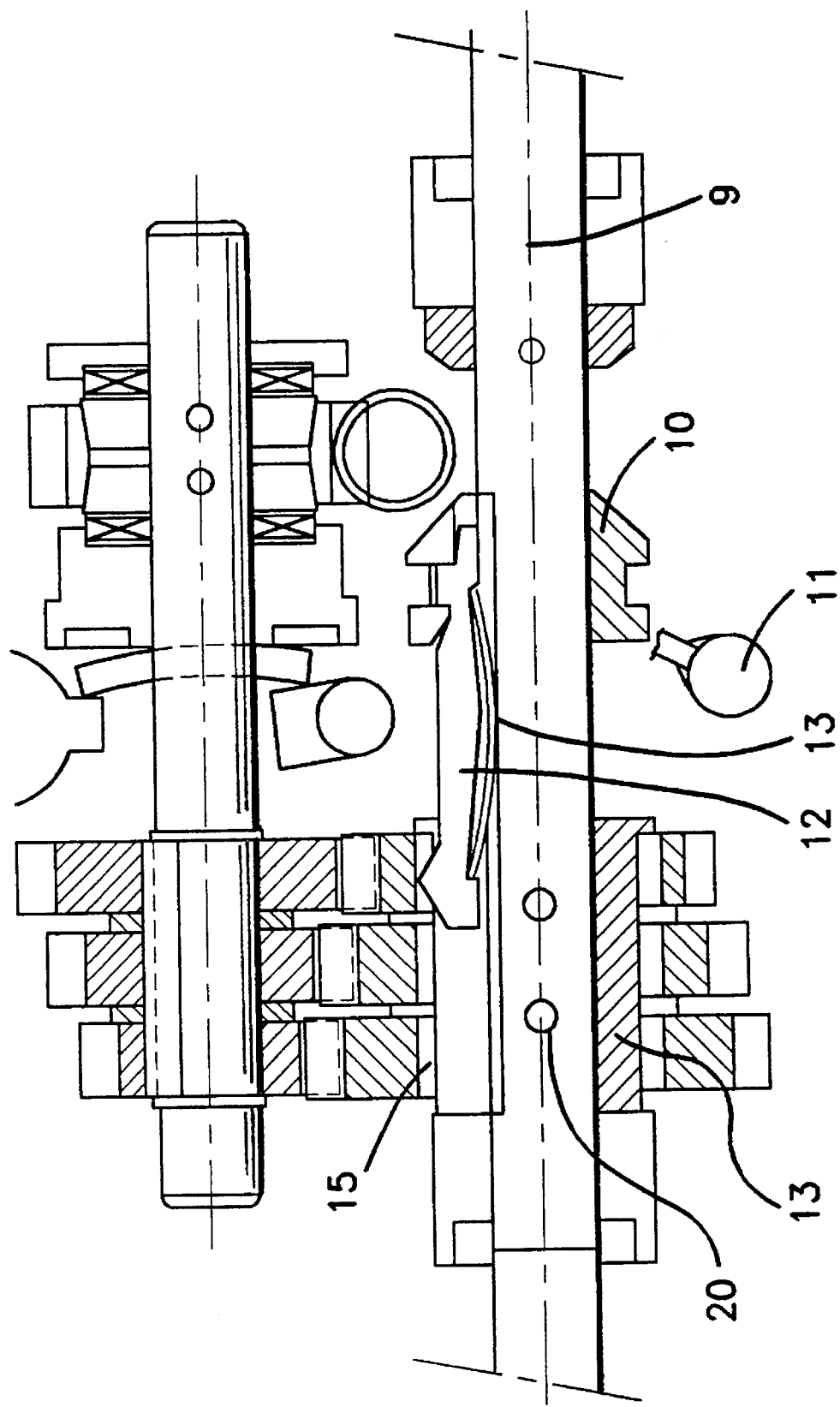
FIG. 4 represents a cross-sectional view of a modification of the gearbox shown in FIG. 1.

Similarly, the transmission means of the rotational movement of the primary shaft to the secondary shaft, taken in combination with the drive means of the primary shaft, prove to be particularly interesting. Thus, the rotational movement of the primary shaft 1 is transmitted to the secondary shaft 2 by means of a movable key 12 mounted on the secondary shaft 2 and which, during its axial displacement, comes into contact selectively with a recess 15 provided in the peripheral internal edge of one gear 9 carried by the secondary shaft so as to key selectively this gear with the secondary shaft 2. In the example shown in FIG. 1, the key 12 has the shape of a ratchet tooth and is disposed within a longitudinal groove provided in the secondary shaft 2. In the example shown in FIG. 4, the key 12 has again the same shape as a ratchet tooth but it is disposed within a longitudinal groove provided in a split ring 19 mounted fixedly on the secondary shaft 2 by means of suitable securement members. The openings adapted to receive these securement members are shown at 20 in FIG. 4. This longitudinally split ring is fixed by screwing on a flat of the secondary shaft 2. Such an embodiment facilitates the displacement of the key 12 along the secondary shaft 2. This key is displaceable axially along the secondary shaft 2 by means of a ring 10 sliding on the secondary shaft and mounted fixedly to said key 12. The sliding of the ring 10 is achieved by rotation of the control axle or speed selection axle 11. The rotation of the speed selection axle 11 is controlled by a speed selection lever 22 mounted for rotation on a selection control rod (not shown). This speed selection control rod is fixed at 21 on the lever 22 as shown in FIG. 5. The speed selection lever 22 comprises a series of recesses 23 which coact with the end of a leaf spring 24 so as to maintain the lever 22 in a predetermined position. This leaf spring 24 is fixed at its other end to the frame. Thus, during actuation of the speed selection control rod, the speed selection lever 22 is displaced and immobilized by the coaction of the notches 23 and the leaf spring 24 in a predetermined position, displacement giving rise to simultaneous rotation of the speed selection axle 11 which displaces the ring 10 by making it slide. The key 12 constituting a selection and control member for the engagement of the speed ratios, comes, during its axial displacement, into engagement with a recess 15 provided in the peripheral internal edge of a gear 9 carried by the secondary shaft and is maintained within said recess by means of a return member 13. In FIG. 1, this return member 13 is constituted by a leaf spring interposed between the key and the bottom of the longitudinal groove provided in the secondary shaft. As will be evident, any other embodiment of the key can be used.

Figure 6:
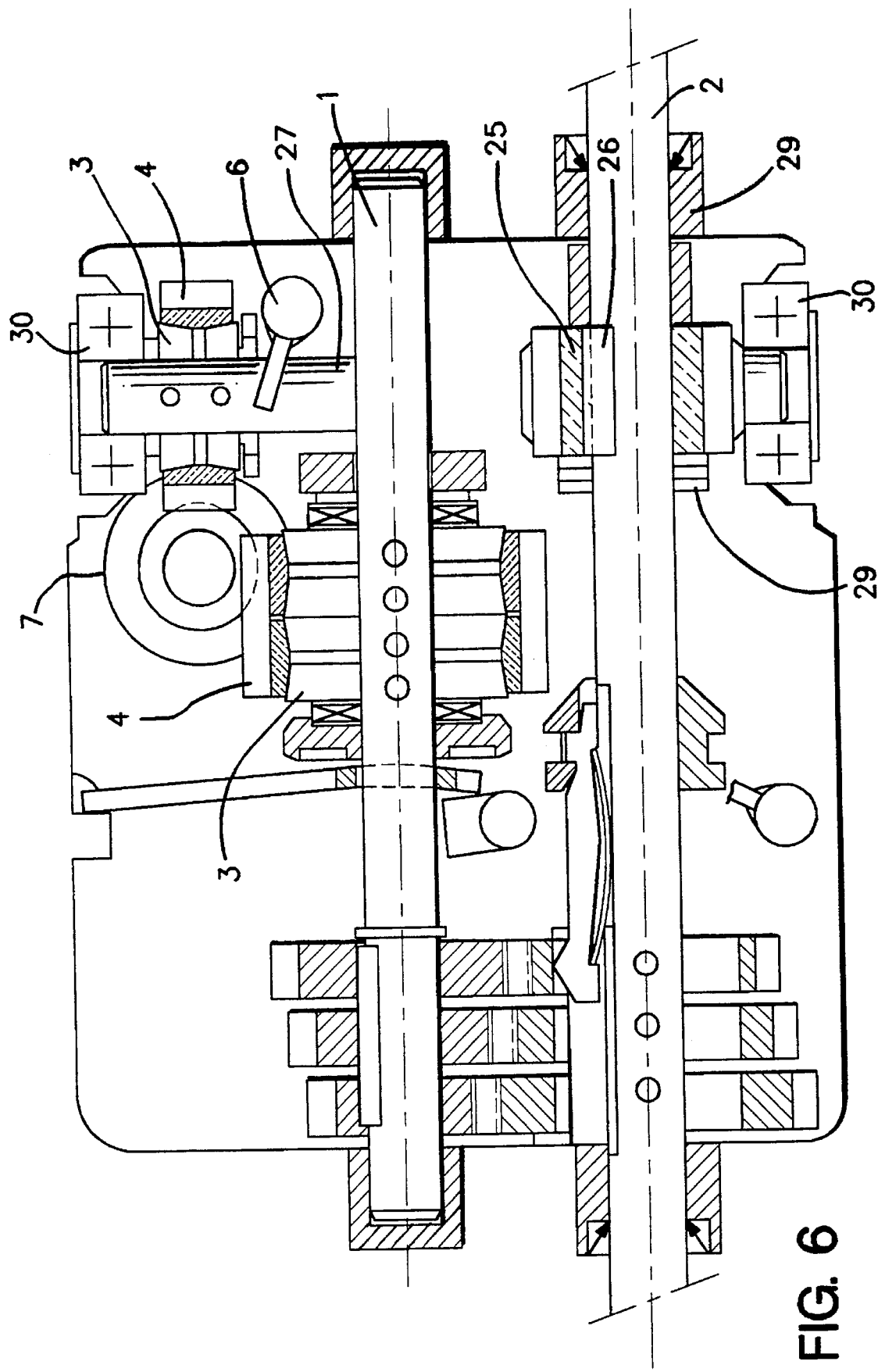
FIG. 6 represents a cross-sectional view of the gearbox of FIG. 2 provided with reverse drive.
Figure 7:
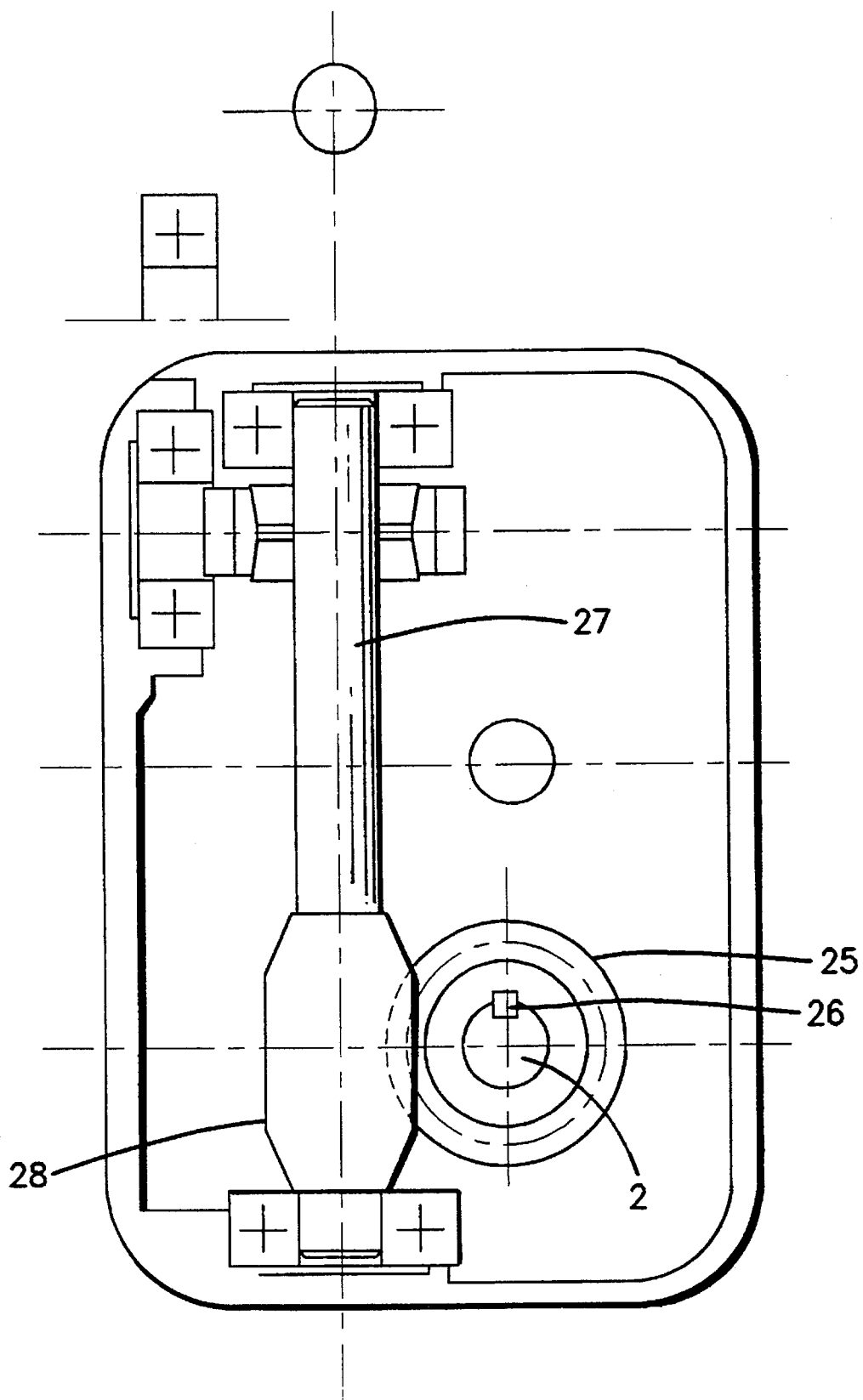
FIG. 7 represents a fragmentary right angle view of FIG. 6 showing only the elements constituting the reverse drive.

It is also possible to provide a rear drive according to that shown in FIGS. 6 and 7. In this case, there is provided in the frame a third shaft 27. This shaft 27 is orthogonal to the primary and secondary shafts. This shaft 27 is maintained in position between two walls of the frame by roller bearings 30. This shaft 27 is provided with a speed reducing mechanism identical to that with which primary shaft 1 is provided. It will accordingly not be described. It is to be noted that there is used the same endless screw for driving in rotation the primary shaft 1 or the reverse drive shaft 27. This shaft 27 comprises at its end adjacent the speed reducing mechanism a cone clutch identical to that of the shaft 1 and is screw threaded at its other end to constitute an endless screw 28. This endless screw 28 is maintained continuously in engagement with a toothed wheel 25 fixedly mounted generally by a key 26 on the secondary shaft 2 such that the rotation of the shaft 27 drives the shaft 2 during actuation of the cone clutch by means of a fork displaced by a cam shaft 6. It will also be noted that the toothed wheel 25 keyed to the secondary shaft 2 is gripped between the partitions 29, one at least of the partitions bearing against a bearing of the secondary shaft 2. Thanks to such an arrangement of reverse drive, there are used members similar to those which were used for the forward drive, which results in a saving of production cost.

Finally, it is generally necessary also to interpose between each gear 9 of the gear train of the secondary shaft a rondelle 14 to avoid simultaneous keying of the two gears with the secondary shaft.

The invention is not limited to the embodiments described above but includes on the contrary a large number of modifications remaining within the scope of the invention.

I claim:

1. A gearbox for self-propelled machines, comprising a frame within which are disposed a primary shaft (1) provided with a gear train (8) mounted kinematically fixed in rotation with said primary shaft, a secondary shaft (2) provided with a gear train (9) disposed coaxially and mounted freely in rotation about said secondary shaft (2), each gear of the gear train (8) of the primary shaft (1) being respectively maintained in permanent engagement with a gear of the gear train (9) of the secondary shaft (2); the improvement wherein the primary shaft (1) is driven in rotation by a speed reduction mechanism constituted by a driving member comprising an endless screw (7) in engagement with a driven member comprising at least one toothed wheel (4) adapted to be coupled with or uncoupled from said primary shaft by means of a clutch mechanism comprising a cone clutch whose cones (3) are freely slidably mounted upon and kinematically fixed in rotation with the primary shaft and are disposed within an axial recess of said driven member, and wherein said cones come in the course of their approach to each other into engagement with conical contact surfaces of said driven member, and wherein the movement of rotation of said primary shaft (1) is transmitted to the secondary shaft (2) by means of a movable key (12) mounted on the secondary shaft which, during its axial displacement, comes into contact selectively with the internal peripheral edge of a gear of the gear train (9) of the secondary shaft (2) so as selectively to key said gear (9) to the secondary shaft (2), and wherein said endless screw and said cone clutch are disposed within said frame, wherein the clutch mechanism comprises at least two toothed wheels (4a, 4b) in enqagement respectively with at least one said clutch cone (3a, 3b), said at least two toothed wheels being maintained kinematically fixed in rotation by penetration of teeth (16) projecting beyond a front surface of at least one of the wheels into interstices (17) of complementary shape of a front surface of a said wheel facing said at least one of the wheels so as to maintain between said wheels a permanent contact without play in rotation in an engaged position.

2. A gearbox according to claim 1, wherein the clutch mechanism comprises at least four cones mounted freely upon sand slidably and kinematically fixed in rotation with the primary shaft, pairs of said cones being respectively disposed coaxially of an interior of an axial bore of said toothed wheels so as to come, during their approach to each other, into engagement with conical contact surfaces of said toothed wheels.

3. A gearbox according to claim 1, wherein one of said wheels (4b) has a recess (18) provided on its front surface so as to permit at least one tooth of said teeth to pass through so that it will penetrate the interstice (17) between two of said teeth of a facing said wheel.

4. A gearbox according to claim 3, wherein the recess (18) is provided at a variable height in a space comprised between a circumference passing through a base of said teeth and a circumference passing through tips of said teeth.

5. A gearbox for self-propelled machines, comprising a frame within which are disposed a primary shaft (1) provided with a gear train (8) mounted kinematically fixed in rotation with said primary shaft, a secondary shaft (2) provided with a gear train (9) disposed coaxially and mounted freely in rotation about said secondary shaft (2), each gear of the gear train (8) of the primary shaft (1) being respectively maintained in permanent engagement with a gear of the gear train (9) of the secondary shaft (2); the improvement wherein the primary shaft (1) is driven in rotation by a speed reduction mechanism constituted by a driving member comprising an endless screw (7) in engagement with a driven member comprising at least one toothed wheel (4) adapted to be coupled with or uncoupled from said primary shaft by means of a clutch mechanism comprising a cone clutch whose cones (3) are freely slidably mounted upon and kinematically fixed in rotation with the primary shaft and are disposed within an axial recess of said driven member, and wherein said cones come in the course of their approach to each other into engagement with conical contact surfaces of said driven member, and wherein the movement of rotation of said primary shaft (1) is transmitted to the secondary shaft (2) by means of a movable key (12) mounted on the secondary shaft which, during its axial displacement, comes into contact selectively with the internal peripheral edge of a gear of the gear train (9) of the secondary shaft (2) so as selectively to key said gear (9) to the secondary shaft (2), and wherein said endless screw and said cone clutch are disposed within said frame, wherein there is provided within the frame a supplemental shaft (27) driven in rotation by a speed reduction mechanism constituted by the driving member (7) of the primary shaft in engagement with a driven member comprising at least one toothed wheel (4), adapted to be coupled with or uncoupled from said supplemental shaft by means of a clutch mechanism comprising a cone clutch whose cones are mounted freely slidably upon and kinematically fixed in rotation to the supplemental shaft and are disposed within an axial recess of said driven member and come in the course of their approach to each other into contact with conical portions of said driven member, said supplemental shaft comprising at its end opposite to an end bearing the clutch mechanism a screw threading constituting an endless screw (28) in engagement with a toothed wheel (25) mounted fixedly on the secondary shaft (2) such that the rotation of said supplemental shaft (27) causes a rotation in the same direction of the secondary shaft (2) adapted to permit a displacement in reverse drive of the self-propelled machine.

* * * * *